United States Patent Office 3,496,076
Patented Feb. 17, 1970

3,496,076
NIOBIUM ANODIZING ELECTROLYTE AND ANODIZING PROCESS
David M. Cheseldine, Bennington, Vt., assignor to Sprague Electric Company, North Adams, Mass., a corporation of Massachusetts
No Drawing. Filed Mar. 28, 1968, Ser. No. 717,022
Int. Cl. C23b 9/00
U.S. Cl. 204—56                        5 Claims

ABSTRACT OF THE DISCLOSURE

An electrolyte for the anodic oxidation of niobium capacitor electrodes. The composition contains a ratio of nitric acid to water of greater than 1:4. Optionally present are one or more of an organic solvent, sulfuric acid and phosphoric acid. The process involves anodization in the foregoing electrolyte. For higher voltage units, this is followed by further anodization in a dilute electrolyte.

BACKGROUND OF THE INVENTION

This invention relates to the formation of a stable anodic oxide film on a niobium substrate and the electrolyte employed in said formation.

Previous attempts have been made to use niobium in place of tantalum in electrolytic capacitors. A number of advantages would arise from such a substitution since niobium is relatively less expensive; the ore is more abundant and deposits are more favorably located. Moreover, its oxide has a higher dielectric constant than that of tantalum. However, in spite of the similarity of the two metals the anodic oxide of niobium grown under conditions similar to those used for growing tantalum oxide, i.e., in dilute aqueous solution, shows unstable behavior making it unsuitable for using it as a dielectric in an electrolytic capacitor. The instability of the niobium oxide film is characterized in capacitors by poor shelf life and high leakage currents. Characteristics of the film itself are a lack of stability to heat and a high sensitivity to small fields when applied in the direction, niobium negative. For example, negative polarities of a few tenths of a volt or temperatures of the order of 200° C. both cause large increases of capacity and RC.

It is an object of the present invention to present a process for forming an anodic oxide film on niobium for use as a dielectric of an electrolytic capacitor.

A further object of the invention is to provide an anodic oxide film on niobium, such film being characterized by superior stability conditions of heat and negative polarity.

A further object of the invention is the provision of anodic oxide film on niobium for use as a dielectric of an electrolytic capacitor, such capacitor being charaterized by greater electrolytic stability than prior art capacitors employing anodic niobium films.

A still further object of the invention is to provide an electrolyte system which, under suitable conditions, is capable of forming excellent anodic films on niobium.

SUMMARY OF THE INVENTION

In accordance with the invention an electrolyte for the anodic oxidation of niobium capacitor electrodes consists essentially of a composition having a ratio of nitric acid to water of greater than 1:4, wherein the nitric acid-water is present in at least 0.1% by weight and having from 0–99.9% by weight of a compatible organic solvent, from 0–50% by weight concentrated sulfuric acid and 0–50% by weight concentrated orthophosphoric acid. When employed, the $H_2SO_4$ and/or $H_3PO_4$ will be in a leakage current reducing amount. In a more limited embodiment the ratio of nitric acid to water ranges from 1:2 to 9:1. In another limited embodiment the organic solvent is a nitroparaffin present in from 10–90% by weight and the sulfuric acid is present in from 0.1–30% by weight. The orthophosphoric acid may replace the sulfuric acid or be present with the sulfuric acid in from 0.1–30% by weight.

The invention further involves the process of anodizing niobium in the electrolyte of the present invention.

The invention also involves the process of forming a high voltage anodized niobium capacitor electrode by anodizing to a first voltage of from about 80–150 volts a niobium capacitor electrode in an electrolyte consisting essentially of a composition having a ratio of nitric acid to water of greater than 1:4, wherein the nitric acid-water is present in at least 0.1% by weight and having from 0.99.9% by weight of a compatible organic solvent, from 0–50% by weight concentrated sulfuric acid and 0–50% by weight concentrated orthophosphoric acid. Thereafter the anodized niobium is further anodized to a higher, second voltage in a dilute electrolyte having an anodizing ionogen. As employed herein the term dilute means up to about 10% by weight of solute. In a more limited process the ratio of nitric acid to water ranges from 1:2 to 9:1 and said oxidizing ionogen is a member selected from the group consisting of nitric acid, phosphoric acid, sulfuric acid, boric acid, citric acid, tartaric acid and salts thereof.

DETAILED DESCRIPTION OF THE INVENTION

The following examples illustrates the advantages of employing the electrolyte of the present invention over those previously used for the formation of anodic films on niobium.

Example I

Test sheets of niobium were prepared by electro-polishing and vacuum annealing. They were then anodized at a current density of 10 ma./cm.$^2$ at 25° C. until the required voltage was attained across the bath. This voltage was maintained until the leakage current was reduced to 10 $\mu$a./cm.$^2$. The capacity and RC of the films at 120 cycles were then measured, using an AC signal of 20 mv., in a solution of 10% ammonium dihydrogen phosphate

TABLE 1

| Forming Electrolyte | (a) Formation voltage 30 v. | | | | | | | |
|---|---|---|---|---|---|---|---|---|
| | Conc. $HNO_3$ | | | | 0.1% $H_2SO_4$ | | | |
| Hours at 200° C | 0 | | 1.5 | | 0 | | 1.5 | |
| | Cap., uf./cm.$^2$ | RC | Cap., uf./cm.$^2$ | RC | Cap., uf./cm.$^2$ | RC | Cap., uf./cm.$^2$ | RC |
| Voltage—Nb vs. sat. cal. electrode (mv.): | | | | | | | | |
| +460 | 0.490 | 15 | 0.526 | 18 | 0.521 | 18 | 0.718 | 37 |
| 0 | 0.498 | 17 | 0.530 | 19 | 0.529 | 21 | 0.744 | 41 |
| −400 | 0.503 | 19 | 0.536 | 20 | 0.539 | 57 | 2.213 | 579 |
| | (b) Formation voltage 75 v. | | | | | | | |
| +460 | 0.203 | 14 | 0.221 | 8.5 | 0.215 | 14 | 0.326 | 21 |
| 0 | 0.204 | 15 | 0.223 | 10 | 0.216 | 16 | 0.360 | 52 |
| −400 | 0.205 | 18 | 0.224 | 11 | 0.218 | 20 | 2.48 | 1,000 | while the niobium potential was held within a few tenths of a volt from that of a saturated calomel electrode in the same electrolyte. Measurements were repeated after heating the oxide coated electrode at 200° C. in air.

In Table 1 the results obtained using an electrolyte falling within the scope of this invention, namely, concentrated nitric acid (70% $HNO_3$) are compared with those obtained in a typical aqueous electrolyte, 0.1% $H_2SO_4$. It can be seen from the table that when the anodic film is formed in concentrated $HNO_3$ there is relatively little variation of capacity and RC with DC bias. Between +460 and −400 mv. the capacity change is only 2.5% for a 30v. formation and 1.2% for a 75 v. formation compared with 3.4% and 1.2% for the same voltage formations in 0.1% $H_2SO_4$. After heating for 1.5 hours at 200° C. the 30 v. film formed in $HNO_3$ shows a variation in capacity of 1.9% between +460 and −400 mv. and the 75 v. film shows a variation of 1.2% over the same range. The corresponding figures for the 0.1% $H_2SO_4$ formation are 310% and 760%. Also, the absolute capacity increase during heating is greater for the 0.1% $H_2SO_4$ formation at any potential in the range covered.

Example I shows the improved stability toward heating of a film formed in an electrolyte of the present invention. The conditions under which the film was tested were chosen as typical of those arising during the manufacture or life of a capacitor. For instance, in the manufacture of solid electrolyte capacitors the step in which the electrolyte is prepared by pyrolysis in situ is carried out at temperatures of 200° C. or preferably higher. Potentials across the oxide film can arise in a number of ways apart from those caused by external application of a DC or AC voltage across the capacitor. Commonly used electrolytes cause potentials falling within the range covered by measurements in Table 1. Shorting the anode to the cathode can alter the potential across the film. Also, AC signals commonly used to measure capacitance (120 cycles) effectively cause potentials in both directions across the oxide film.

Measurements of films formed in 0.1% $H_2SO_4$ are typical of films formed on niobium in many electrolytes, e.g., aqueous solutions of phosphates, borates, nitrates, tartrates and other conventional oxide forming electrolytes.

Not only are films formed in $HNO_3$ more stable to heat and bias than films formed in prior art electrolytes; they are also more stable to shelf conditions, e.g., storage in air at room temperature. Films formed in prior art electrolytes, particularly thin films (30 v. and less), show large capacity and RC increases after idling if the measurements are made with a slightly negative bias.

Example II

Tests sheets of niobium were prepared and anodized as in Example I. After measuring capacity and RC they were left in air at room temperature for 16 hours and then retested.

Figures in Table 2 show how the capacity and RC of films formed in 0.1% $H_2SO_4$ increase when measured at zero or negative bias after idling at room temperature compared with a decrease of these parameters for films formed in $HNO_3$. A drop of capacity and RC is the normal behavior of stable films such as those grown on tantalum. The drop is generally assumed to be associated with dielectric relaxation processes.

A wide range of aqueous nitric acid concentrations may be employed in the electrolyte compositions of this invention ranging from about 20% $HNO_3$ up to the highest concentrations available. A preferred concentration range is from about 35% $HNO_3$ to about 90% $HNO_3$.

Example III

Test sheets of niobium were prepared and anodized as in Example I employing several different concentrations of $HNO_3$. Also included is a film formed in 1% $H_2SO_4$ which can be regarded as typical of a dilute aqueous electrolyte.

TABLE 3.—FORMATION VOLTAGE 30 V.

| Forming Electrolyte | Potential Nb. vs. Sat. Cal. Electrode (mv.) | Capacity (8 cm.²) Initial [a] | Final [b] | RC Initial [a] | Final [b] |
|---|---|---|---|---|---|
| 70% $HNO_3$ [c] | +460 | 4.15 | 4.05 | 24 | 22 |
| | −600 | 4.26 | 4.17 | 28 | 25 |
| | −1,000 | 4.27 | 4.20 | 31 | 32 |
| 50% $HNO_3$ | +460 | 4.17 | 4.35 | 22 | 30 |
| | −600 | 4.38 | 4.66 | 34 | 44 |
| | −1,000 | 4.63 | 5.24 | 70 | 114 |
| 35% $HNO_3$ | +400 | 4.21 | 4.17 | 33 | 24 |
| | −600 | 4.58 | 4.70 | 65 | 108 |
| | −1,000 | 4.83 | 5.38 | 183 | 321 |
| 23% $HNO_3$ | +460 | 4.43 | 5.77 | 27 | 62 |
| | −600 | 4.87 | 107 | 116 | 1,650 |
| 14% $HNO_3$ | +460 | 4.29 | 4.32 | 22 | 26 |
| | −600 | 4.61 | 59.4 | 103 | 3,132 |
| | +460 | 4.24 | 4.20 | 23 | 22 |
| | −600 | 4.35 | 15.4 | 60 | 1,610 |
| 1% $H_2SO_4$ | +460 | 4.39 | 4.45 | 23 | 30 |
| | −600 | 6.63 | 95.6 | 741 | 2,530 |

[a] Immediately after formation of oxide.
[b] After standing for 4 days in air.
[c] Commercially available concentrated acid.

Table 3 shows a progressive deterioration of stability as more dilute formation electrolytes are employed. On the basis of the results shown, units formed in $HNO_3$ concentrations of less than about 20% would clearly be inferior to units formed at higher concentrations. It is preferred that the concentration be about 35% $HNO_3$ or higher.

Since it is desirable to employ compatible organic solvents with the nitric acid and since the nitric acid must not be less than 20% of the water present in the system, it is deemed better to express the $HNO_3$-water limitations as a ratio of the two rather than expressing percentages. Thus, it has been determined that the ratio of nitric acid

TABLE 2

| | (a) Formation voltage 30 v. | | | | | | | |
|---|---|---|---|---|---|---|---|---|
| Forming Electrolyte | Conc. $HNO_3$ | | | | 0.1% $H_2SO_4$ | | | |
| Hours at Room Temp. | 0 | | 16 | | 0 | | 16 | |
| | Cap., uf./cm.² | RC | Cap., uf./cm.² | RC | Cap., uf./cm.² | RC | Cap., uf./cm.² | RC |
| Voltage—Nb vs. sat. cal. electrode (mv.): | | | | | | | | |
| +460 | 0.550 | 18 | 0.528 | 13 | 0.513 | 16 | 0.513 | 16 |
| 0 | 0.556 | 18 | 0.528 | 14 | 0.525 | 27 | 0.546 | 50 |
| −200 | 0.559 | 18 | 0.529 | 14 | 0.544 | 114 | 0.798 | 434 |
| | (b) Formation voltage 75 v. | | | | | | | |
| +460 | 0.219 | 14 | 0.210 | 11 | 0.224 | 19 | 0.220 | 19 |
| 0 | 0.220 | 15 | 0.214 | 13 | 0.225 | 22 | 0.224 | 74 |
| −200 | 0.221 | 17 | 0.214 | 14 | 0.225 | 22 | 0.230 | 115 | to water must be greater than 1:4 and preferably it should range from 1:2 to 9:1.

The contemplated organic solvents are limited only by their reactivity to HNO$_3$. So long as there is not a strong competing reaction between the nitric acid and solvent, almost any organic solvent can be employed. By way of example, using an electrolyte of 50% fuming HNO$_3$ (nitric acid:water=9:1) and 50% nitromethane, niobium specimens were anodized to 30 volts and the resultant films showed consistently about 0.5% capacity variation from +460 mv. to −600 mv. These films, when heated in vacuum at 200° C. for 1.5 hours, gained about 20% capacity both at +400 mv. and at −600 mv. compared with a 300% capacity increase at +460 mv. for specimens formed in aqueous nitric acid alone $$(HNO_3:H_2O=7:3)$$

and about 1200% for units formed in 0.1% aqueous H$_2$SO$_4$.

In order for the niobium to be effectively anodized, the ratio of NO$_3$ ions to OH ions must be about that established by the at least 1:4 ratio of acid to H$_2$O. This ratio is not greatly upset by the addition of the contemplated organic solvents and the acid is not in effect diluted.

In addition to the nitroparaffins, e.g. nitromethane, nitroethane, nitropropane, any other organic solvent, compatible and miscible with nitric acid may be employed. The organic solvent may be employed in a wide range of proportions i.e. from zero to 99.9%. Extremely high percentages of organic solvents find their greatest utility for high voltage formations.

The addition of concentrated sulfuric acid and/or concentrated phosphoric acid has also been found to be beneficial in that it reduces the leakage current of the formed oxide to about one quarter of the value obtained in the absence of these acids. In general, when employed the sulfuric and/or phosphoric acid proportion should be sufficient to reduce the leakage current of the anodic oxide. Care must be exercised to maintain the at least 1:4 ratio of nitric acid to water. The sulfuric acid may be present in the electrolyte in from 0.1–30% by weight and the orthophosphoric acid may replace or be present with the sulfuric acid in from 0.1–30% by weight. A particularly preferred electrolyte contains 15% by weight sulfuric acid, 28–29% by weight nitroethane and 56–57% fuming HNO$_3$.

A two stage formation process may be carried out whereby niobium is first anodized to a first voltage of from about 80–150 volts in the electrolyte of the present invention and thereafter anodization is continued to a higher voltage in a more dilute nitric acid or any other electrolyte suitable for the formation of high voltage (e.g. greater than 100 volt) films. Dilute phosphoric or sulfuric acid, or low ionic concentrations of boric acid, citric acid, tartaric acids and their salts dissolved in glycol-water mixtures may be employed.

Since it is obvious that many changes and modifications can be made in the above-described details without departing from the nature and spirit of the invention it is to be understood that the invention is not limited to said details except as set forth in the appended claims.

What is claimed is:

1. The process of forming a high voltage, anodized niobium capacitor electrode comprising anodizing to a first voltage of from about 80–150 volts a niobium capacitor electrode in an electrolyte consisting essentially of a composition having a ratio of nitric acid to water of greater than 1:4, where the nitric acid-water is present in at least 0.1% by weight and having from 0–99.9% by weight of a compatible organic solvent, and from 0–50% by weight of concentrated sulfuric acid and/or concentrated orthophosphoric acid and thereafter further anodizing said electrode to a voltage in excess of said first voltage in a dilute electrolyte having an anodizing ionogen.

2. The process of claim 1 wherein the ratio of nitric acid to water ranges from 1:2 to 9:1 and said anodizing ionogen is a member selected from the group consisting of nitric acid, phosphoric acid, sulfuric acid, boric acid, citric acid, tartaric acid and the salts thereof.

3. The process of claim 1 wherein the organic solvent is a nitropariffin present in from 10–90% by weight and the sulfuric acid is present in from 0.1–30% by weight.

4. The process of claim 1 wherein the organic solvent is a nitroparaffin present in from 10–90% by weight and the orthophosphoric acid is present in from 0.1–30% by weight.

5. The process of claim 1 wherein the organic solvent is a nitroparaffin present in from 10–90% by weight, the sulfuric acid is from 0.1–30% by weight and the orthophosphoric acid is from 0.1–30% by weight.

References Cited

The Anodizing of Zirconium and Other Transition, Metals in Nitric Acid, by Misch et al., J. Electro Chem. Soc., vol. 100, No. 12, December 1953, p. 533.

The condensed Chemical Dictionary, by Francis Turner, 1950, p. 448.

An outline of Organic Nitrogen Compounds by Ed Degering, 1945, p. 65.

JOHN H. MACK, Primary Examiner

R. L. ANDREWS, Assistant Examiner

PO-1050
(5/69)

UNITED STATES PATENT OFFICE
CERTIFICATE OF CORRECTION

Patent No. __3,496,076__  Dated __February 17, 1970__

Inventor(s) __David M. Cheseldine__

It is certified that error appears in the above-identified patent and that said Letters Patent are hereby corrected as shown below:

Column 1, line 55, change "charaterized" to -- characterized --
Column 2, line 30, change "0.99.9%" to -- 0-99.9% --
Columns 3 and 4, in Table 2, in the column under (b) "0.210" should be -- 0.201 --
Column 5, line 5, after "and" add -- the --
Column 6, line 30, change "nitropariffin" to -- nitroparaffin --

SIGNED AND
SEALED
SEP 15 1970

(SEAL)
Attest:

Edward M. Fletcher, Jr.
Attesting Officer

WILLIAM E. SCHUYLER, JR.
Commissioner of Patents